US011271721B2

(12) United States Patent
Troia et al.

(10) Patent No.: US 11,271,721 B2
(45) Date of Patent: Mar. 8, 2022

(54) DISTRIBUTED SECURE ARRAY USING INTRA-DICE COMMUNICATIONS TO PERFORM DATA ATTESTATION

(71) Applicant: Micron Technology, Inc., Boise, ID (US)

(72) Inventors: Alberto Troia, Munich (DE); Antonino Mondello, Messina (IT)

(73) Assignee: Micron Technology, Inc., Boise, ID (US)

( * ) Notice: Subject to any disclaimer, the term of this patent is extended or adjusted under 35 U.S.C. 154(b) by 308 days.

(21) Appl. No.: 16/363,103

(22) Filed: Mar. 25, 2019

(65) Prior Publication Data
US 2020/0313862 A1    Oct. 1, 2020

(51) Int. Cl.
H04L 9/06    (2006.01)
H04L 9/32    (2006.01)

(52) U.S. Cl.
CPC ......... H04L 9/0643 (2013.01); H04L 9/3236 (2013.01)

(58) Field of Classification Search
CPC .. H04L 9/0643; H04L 9/3236; H04L 2209/26; H04L 9/3239; G06F 21/64
See application file for complete search history.

(56) References Cited

U.S. PATENT DOCUMENTS

| | | | |
|---|---|---|---|
| 7,249,255 B2 * | 7/2007 | Anand | H04L 9/0643 380/28 |
| 9,947,401 B1 * | 4/2018 | Navon | G06F 11/0727 |
| 2009/0063507 A1 * | 3/2009 | Thompson | G06F 16/1834 |
| 2009/0144582 A1 * | 6/2009 | Li | G06F 21/575 714/6.3 |
| 2009/0228701 A1 * | 9/2009 | Lin | H04L 9/321 713/155 |
| 2017/0061832 A1 * | 3/2017 | Ghosh | G09C 1/00 |
| 2018/0254888 A1 * | 9/2018 | Monahan | G06F 16/90 |
| 2018/0330098 A1 * | 11/2018 | Wyseur | G06F 21/52 |
| 2018/0373598 A1 * | 12/2018 | Mondello | G06F 11/1458 |
| 2020/0273840 A1 * | 8/2020 | Elsherbini | H01L 23/3675 |

* cited by examiner

*Primary Examiner* — Izunna Okeke
(74) *Attorney, Agent, or Firm* — Greenberg Traurig

(57) ABSTRACT

Techniques for calculating a hash value of a single secure array of memory blocks in a sequential set of dice. The array can be defined by a set of address-size pairs. Each pair provides a pointer by including an address of a memory block and a size of the block. The hash value can be calculated by: for each die that is not the last die, partially applying a hash function, without final padding, to the memory blocks of the secure array in the die to generate a partial digest. And, for the last die, fully applying the hash function, with the final padding, to the memory blocks of the secure array in the last die to generate the hash value of the secure array, which can include adding an accumulation of partial digests to data from the last die as a basis for the generation of the hash value.

20 Claims, 8 Drawing Sheets

300 receiving request for calculating a hash value of a secure array of memory blocks in sequential set of dice
302 in response to receiving the request, calculating the hash value of the secure array, by:
304 for each particular die of set of dice that is not first die or last die, receiving by particular die, from a preceding die of set, partial digest of first die or accumulation of partial digests of preceding dice in set
306 for each particular die of set of dice that is not last die, partially applying hash function, without certain padding, to memory blocks of secure array in particular die to generate partial digest for particular die
308 adding partial digest of first die or accumulation of partial digests to message comprising data from memory blocks of particular die as basis for generation of partial digest for particular die
310 for each particular die of set of dice that is not last die, communicating, to subsequent die of set of dice, partial digest of particular die
312 for last die in set of dice, receiving by last die, accumulation of partial digests of preceding dice in set
314 for last die in set of dice, fully applying hash function, with certain padding, to memory blocks of secure array in last die to generate complete digest for last die and hash value of secure array
316 adding partial digest of first die or accumulation of partial digests to pre-processed message comprising data from memory blocks of last die as a basis for generation of complete digest of last die and hash value of secure array
318 validating the hash value of the secure array by comparing the hash value to a validation code
320

```
in response to receiving the request, calculating a hash value of the secure array, by:
504
```

⋮

```
Operation 516
(See FIG. 5)
```

```
for the last die in the set of dice, receiving the accumulation of partial digests from the preceding dice
in the set
518
```

```
for the last die in the set of dice, fully applying the hash function, with the certain padding, to the
memory blocks of the secure array in the last die to generate a complete digest for the last die and the
hash value of the secure array
520
```

```
adding the accumulation of partial digests to a pre-processed message comprising data from the
memory blocks of the last die as a basis for the generation of the complete digest of the last die
and the hash value of the secure array
522
```

```
validating the hash value of the secure array by comparing the hash value to a validation code
524
```

FIG. 6

DISTRIBUTED SECURE ARRAY USING INTRA-DICE COMMUNICATIONS TO PERFORM DATA ATTESTATION

FIELD OF THE TECHNOLOGY

At least some embodiments disclosed herein relate to a single distributed secure array using intra-dice communications to perform data attestation across a sequential set of dice.

BACKGROUND

One of the most important features of a secure system is the data attestation. Data attestation can provide assurance that a pattern stored in a memory array is genuine. To put it another way, data attestation can provide assurance that a pattern stored in a memory array is the same data programmed by components of a motherboard and/or the component owner. Many threats can affect the data stored in memory, and the threats can be even greater when data blocks of the memory array are distributed across multiple dice.

Despite threats to multiple dice systems and packages, such technologies are very useful in reducing usage of space on a motherboard, increasing performance, and decreasing power usage, for example. An example of a multiple dice system and package is a multi-chip package (MCP). A MCP is an electronic assembly including a package where multiple integrated circuits (ICs), semiconductor dice and/or other electronics components are integrated. Such parts are usually combined on a substrate, so that the parts are treated as a single component. A MCP can include one or more hybrid integrated circuits and stacked dice in a vertical arrangement. A MCP can include dice in a horizontal and/or vertical arrangement.

Intra-dice communications can be used between die of a package to communicate power consumption information. Intra-dice communications protocols can be used to monitor power consumption and determine allocation of power consumption to reduce power consumption in a package of dice.

Although multiple dice systems and packages are very useful, there are problems with current implementations of such technologies. This includes problems with attestation in a MCP as well as related problems in intra-dice communications.

The threats to multiple dice systems and packages can include faults in the memory array or supporting circuitry and malicious or invalid activity occurring in the memory array or supporting circuitry. Such problems can also occur in the intra-dice communications and supporting hardware and software.

Many hardware solutions have been created to limit threats in memory blocks, including hardware solutions for memory blocks distributed across multiple dice. However, such solutions can be costly. Software and/or firmware-based solutions that leverage already existing hardware can be more cost effective.

The solutions, whether hardware, firmware, and/or software-based, can utilize cryptography to secure memory blocks and corresponding communications of data via a secure array. For example, a hash function, such as SHA256, can be used to secure memory blocks and corresponding communications of data via a secure array.

Hashing for attestation can include, at powerup or at a user request, fetching data from a memory array, and then hashing the data. Then for attestation purposes, the resulting hash value can be compared with an authentication code (also known as a "golden value").

The set of data to be attested and hashed can occur in an array. Often, if the set of data occurs in an array, the array can be referred to as a secure array. The secure array can be a subset of a whole array of data for data of a memory device or system. The secure array can be defined by using non-volatile registers. The definition of such registers can be done by using an authenticated command set to generate memory block locator pairs. The pairs can be or include memory block address-size pairs.

A secure array can be a very useful technology in securing multiple dice. A respective secure array for a die can assist in protecting the die of a set of dice in a package or system. A problem with using a respective secure array per die in a set of dice is that multiple secure arrays need to be separately defined and attested, which can result in more hashing than preferred as well as other problems. Other problems can include using additional resources to generate and store an authentication value for each die. Also, the limit of the aforesaid approach is that the definition of the secure array must be stopped at the edge of each die, so with multiple die packages and systems, multiple secure arrays, multiple sets of pairs, and multiple authentication codes are needed unless certain hardware modifications are made to current memory devices, which can be costly. For example, a transparent stack can be used to link one die with another by using unique hardware-based identifications for each die. But, this technique is known to require hardware modifications.

BRIEF DESCRIPTION OF THE DRAWINGS

The present disclosure will be understood more fully from the detailed description given below and from the accompanying drawings of various embodiments of the disclosure.

FIGS. 3, 4, 5, and 6 each illustrate example operations, in accordance with some embodiments of the present disclosure. Specifically, FIG. 4 illustrates a graphical representation of some of the parsing and padding rules related to the methods depicted in FIGS. 3, 5 and 6.

DETAILED DESCRIPTION

In general, examples of the systems and methods disclosed herein for implementing a single distributed secure array, using intra-dice communications to perform data attestation, provide specific technical solutions to at least the technical problems mentioned in the background section and other parts of the application as well as other technical problems not described herein but recognized by those of skill in the art.

A sequential set of dice can be part of one or more MCPs, MNANDs, MDRAMs, and/or other multiple-die devices. The set of dice can and be connected over one or more vias, buses, and/or computer networks. The validity of a secure array of memory blocks in a sequential set of dice can be confirmed through a hashing function (or other form of cryptography) and comparing the result of the hashing function to a validation code (also known as a "golden value"). Many of the problems mentioned herein with multiple secure arrays for a set of dice can be resolved or at least limited by generating and using a single secure array for the set of dice.

Figure 1:
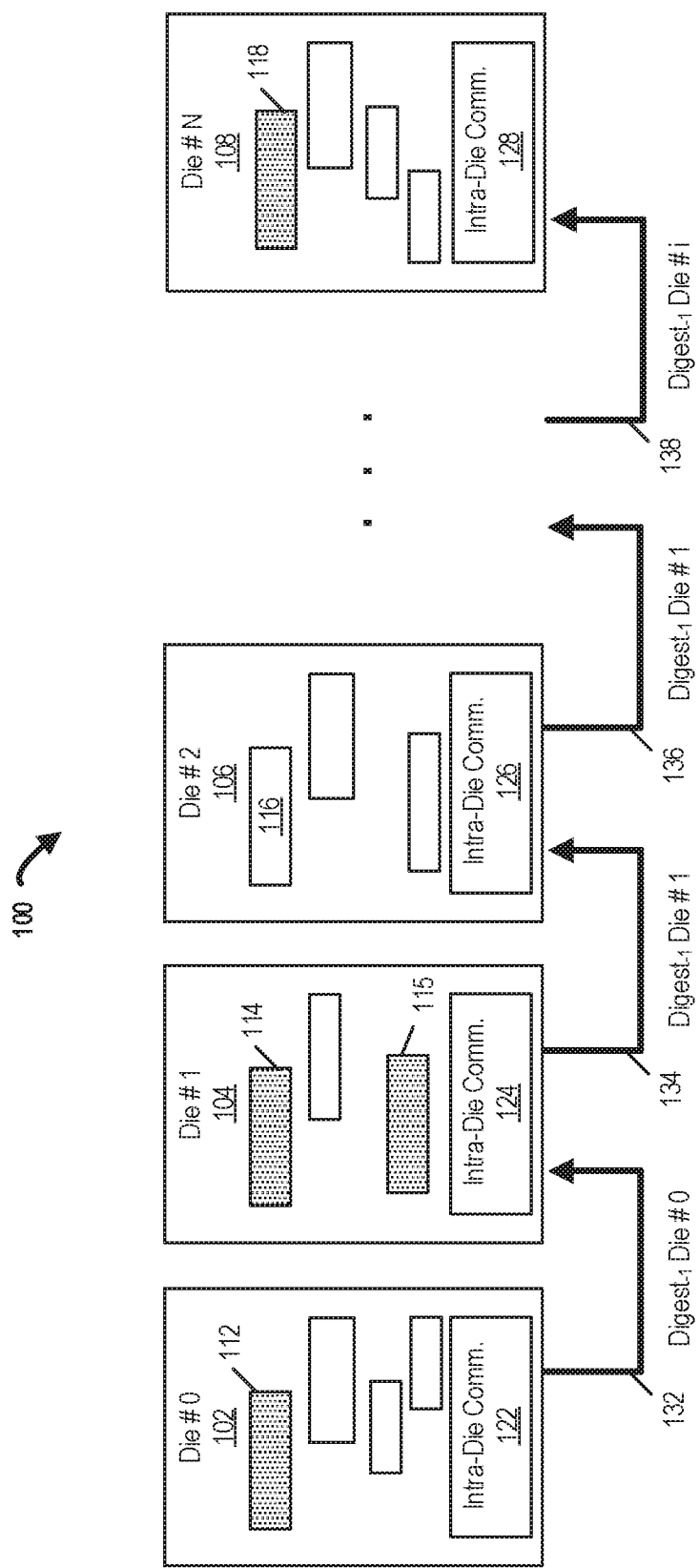
FIG. 1 illustrates distributed memory blocks of a secure array using intra-dice communications to perform data attestation across a sequential set of dice, in accordance with some embodiments of the present disclosure.

One way to implement a single secure array is to use intra-dice communication as a tool for facilitating attestation of the single secure array (E.g., see FIG. 1, which is an illustration of an example procedure for defining the secure array across a sequential set of dice). By using intra-dice communication, as described herein, the physical location of memory blocks amongst the dice becomes a non-factor in attestation of the blocks. The host computing device or system can define a single secure array without factoring in the die locations of memory blocks. The techniques described herein can be more efficient if the sequential set of dice is a chain of dice in that the dice are somewhat similar structurally for example.

An example procedure for defining and/or generating the secure array can be explained using the following instructions.

(Step #1) Start with the first die of the set of dice (e.g., D_NUM=0).

(Step #2) All the secure blocks inside the first die or a subsequent die are measured (e.g., all the secure blocks inside the DIE #D_NUM are measured). However, in the Step #2 measuring of the blocks, the calculus of the measuring is not completed by applying certain padding (such as final padding in a hashing function). The partial result of the partial measurement can be referred to as DIGEST-1 (DIE #D_NUM).

(Step #3) If the die measured is not the last die (e.g., D_NUM <LAST_DIE), the partial digest, $DIGEST_{-1}$ (DIE #D_NUM), generated in Step #2, is communicated using additional padding directly to the next die (e.g., DIE #D_NUM+1). Otherwise, if the die measured is the last die (DIE #LAST_DIE), the calculation is completed (not done partially) in that the certain padding is applied (e.g., the final padding in a hashing function is applied). With the measure of the last die, the hashing of the secure array is completed and the procedure is finished.

(Step #4) Iterate a part of the instructions for the procedure so that the procedure can continue (e.g., D_NUM++). This step occurs if the procedure was not completed in Step #3.

(Step #5) After measuring the blocks of the secure array of a die in the set and communicating the partial digest, $DIGEST_{-1}$ (DIE #D_NUM), to the next die, the procedure repeats itself for the next die (in other words, go to Step #1). This step occurs if the procedure was not completed in Step #3.

Figure 2:
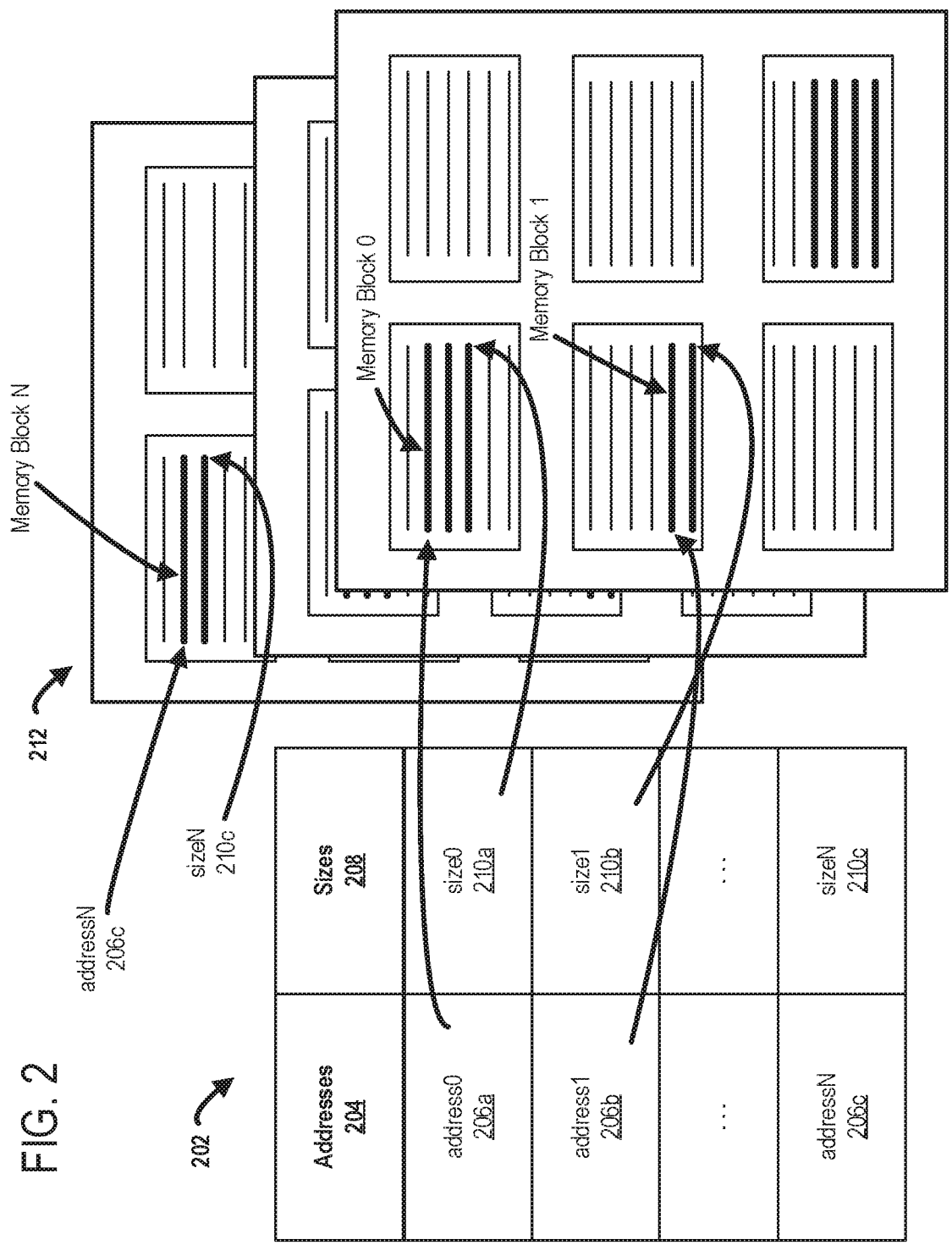
FIG. 2 illustrates how a secure array is defined by a set of address-size pairs for memory blocks of the secure array, in accordance with some embodiments of the present disclosure.

In general, a secure array can be defined by a list of address-size pairs (e.g., see list of address-size pairs 202 depicted in FIG. 2). The pairs can be pointers for pointing to the locations of the memory blocks amongst the set of dice that are chained together to generate a secure array. For example, see the top view of a set of stacked dice 212 and some of its memory blocks defined in list 202 (shown in FIG. 2).

In prior approaches to generating secure arrays, each secure array is limited to be within a single die. One reason for this limitation of prior arrangements is that each die in such arrangements can only access data within itself in computing the hash of the array in the die. One less efficient way of resolving the issues of multiple arrays is to copy the entire array of a die into a next die and request that the next die calculate the hash. This can be a costly procedure, so it can be replaced and improved upon by utilizing intra-dice communications as described herein.

The intra-dice communications among the dice can provide a way for collaborative computation of the hash of the secure array distributed across the set of dice. Each die can do a portion of the computation of the final hash using the data in itself and generating a partial digest and/or result accordingly. The die can then communicate the partial digest and/or result to the next die to continue the final digest computation. As a result, the last die in the set of dice can generate the hash of the entire secure array, and it does not matter how the blocks of the array are distributed among the dice.

Each die can have a computing unit configured to compute a partial digest or result if it is not the last die; and, if it is the last die, the computing unit of the last die can finalize the hash of the secure array. A list of partial digests can be gradually built one die at a time as the list is communicated from one die to the next die in the set. And, then in the last die, the gradually built list can be used with the data of the blocks of the secure array of the last die to be input for the generation of the complete hash of the secure array. Alternatively, the partial digests can be accumulated one die at a time, in that the next partial digest is generated based at least upon the one or more previous partial digests. In such examples, the generation of the next partial digest can include hashing of an accumulation of blocks of data of the array in its die and preceding hashed blocks of data of the array from all or a subset of preceding dice (e.g., see FIG. 4).

The technologies described herein can provide an option to expand a secure array in an MCP device or other type of device with multiple dice so that only a single array is generated and used. The intra-dice communication protocol communicates the information from die to die allowing a check of the secure array, a digest calculation in different sections, and an update of the host register to communicate externally the status and the internal configuration of the device. The techniques also provide an option to have multiple devices inside a package and reduce risk of attack from threat actors or the propagation of errors, and these features can be provided without an external controller. Although, in some embodiments, an external controller can be used.

FIG. 1 illustrates distributed memory blocks of a secure array (e.g., blocks 112, 114, 115, and 118) using intra-dice communications (e.g., intra-dice communications 132, 134, 136, and 138) to perform data attestation across a sequential set of dice (e.g., die 102, die 104, die 106, and die 108 of sequential dice set 100). Some dice in the sequential dice set 100 include memory blocks of a secure array (e.g., see blocks 112, 114, 115, and 118 of die 102, die 104, and die 108). Also, each die includes an intra-die communications interface (e.g., see intra-die communications interfaces 122, 124, 126, and 128). As depicted, each communications interface is communicating a message from one die to another (e.g., see intra-dice communications 132, 134, 136, and 138). Further depicted, die 106 includes a memory block 116, but block 116 is not a part of the secure array. This illustrates that the blocks of the secure array can be a subset of the memory blocks of a set of dice.

Also, FIG. 1 shows that intra-dice communications 132, 134, 136, and 138 each include a partial digest. Communication 132 is shown having a partial digest for die 102. Communication 134 is shown having a partial digest for die 104. The communication of 134 can also have the partial digest of die 102 listed with the partial digest for die 104. Alternatively, the partial digest for die 104 can be a hash or some other form of representation of an accumulation of data of the secure array from dice 102 and 104.

As shown, the communication 136 has the partial digest for die 104 since the die 106 did not have data from a block of the secure array to contribute to the measurement of the complete secure array. A new partial digest is not generated for a die if that die does not have a block of data of the secure array. The partial digest from the last contributing die is just passed through the communications of the non-contributing die to a next die that is able to contribute to the list of digests or accumulation of digests.

Further, communication 138 is shown having a partial digest for die #i (not depicted). In communication 138, the partial digest for die #i is being transferred to die 108, which is the last die (labeled die # N) of sequential dice set 100. The last die, die 108, can complete the digest calculus by adding its contribution of data from memory blocks of the secure array and certain padding (such as final padding) that was missing from the partial digests intra-dice communications.

As illustrated by FIG. 1, the chain of dice is using an intra-dice communications protocol. Alternatively, a separated controller can perform at least part of the protocol.

The aforesaid verification aspects and steps can be assisted by having each die configured as having a specific position in the chain of die. The configuration can occur at the fabrication of the die or afterwards. The configuration can also include creating a space in one of the die to store a validation code (also known as a "golden value").

In some embodiments, the message, sent through the intra-dice communication, can include information that validates and then allows the chain or package to activate the functionality of the die. If, for example, content of the message is different from a validation code inside the dice, the dice can be deactivated and the content cannot be read. Also, the entire chain of die can be deactivated when a message does not match the validation code. After a validation failure, the functionality of the die or the entire chain can return only when the message matches the validation code in another verification process after the failure. The die subsequent to the first die can store the validation code or have the code embedded during fabrication.

FIG. 2 illustrates how a secure array is defined by a set of address-size pairs for memory blocks of the secure array, in accordance with some embodiments of the present disclosure. Depicted is a list of address-size pairs 202. The list of pairs 202 includes addresses of memory blocks of the secure array listed under column of addresses 204 (e.g. address 206a, address 206b, and address 206c). The list of pairs 202 also includes sizes of the blocks of the secure array listed under column of sizes 208 (e.g. size 210a, size 210b, and size 210c). Each row of the list 202 includes an address-size pair for a corresponding memory block of a die in the set of stacked dice 212. As shown, memory block N (e.g., the last block in the secure array) is in a third die of the set of stacked dice 212. Also, as shown, memory blocks 0 and 1 (e.g., the first two blocks in the secure array) are in a first die of the set of stacked dice 212. A second die is arranged vertically in the middle of the first die and the third die of the set 212.

As illustrated by some of the arrows in FIG. 2, a listed address of a memory block represents a location of a beginning of the block in a die, and a corresponding listed size (e.g., size 210a corresponds to address 206a) represents a length of the block and an ending of the block in the die. In other words, the pair of an address and a size of a block defines the location and boundary of the block in the die.

FIGS. 3, 4, 5, and 6 each illustrate example operations performed by example dice and/or a controller of the dice, in accordance with some embodiments of the present disclosure. In general, the example operations can be performed by respective dice of the sequential set of dice. The set of dice can be dice of a MCP or dice of a plurality of MCP and/or dice distributed over a network.

FIG. 3 also illustrates a flow diagram of example operations of method 300, in accordance with some embodiments of the present disclosure. In FIG. 3, the method 300 begins at step 302, with receiving a request for calculating a hash value of a secure array of memory blocks in a sequential set of dice. The set of dice can have at least a first die and a last die. The secure array can be defined by a set of address-size pairs for the memory blocks. Each pair of the address-size pairs can include an address of a memory block in the secure array and a size of the block such that the pair provides a pointer to the block. In some embodiments, the first die of the set initiates the generation of the digest and none of its memory blocks are part of the secure array.

Also, the set of dice can be within a packaged memory device. The set of dice can be stacked. The set of dice can be distributed across multiple memory devices in a computer system. And, the computer system can include multiple computers that are distributed over a computer network comprising a local area network, a wide area network, or a combination thereof.

At step 304, the method 300 continues with, in response to receiving the request, calculating the hash value of the secure array.

At step 306, the calculating the hash value of the secure array can also include, for each particular die of the set of dice that is not the first die or the last die, receiving by the particular die, from a preceding die of the set, the partial digest of the first die or an accumulation of partial digests of all or a subset of preceding dice in the set.

At step 308, the calculating the hash value of the secure array can include, for each particular die of the set of dice that is not the last die, partially applying the hash function, without the certain padding, to the memory blocks of the secure array in the particular die to generate a partial digest for the particular die.

At step 310, the calculating the hash value of the secure array can also include, for each particular die of the set of dice that is not the first die or the last die, in the partially applying of the hash function, adding the partial digest of the first die or the accumulation of partial digests to a pre-processed message comprising data from the memory blocks of the particular die as a basis for the generation of the partial digest for the particular die.

At step 312, the calculating the hash value of the secure array can also include, for each particular die of the set of dice that is not the last die, communicating, to a subsequent die of the set of dice, the partial digest of the particular die.

The hash function can include SHA256 and, for each particular die of the set of dice that is not the last die, the partially applying of the hash function can include applying the function without final padding of SHA256. Also, for each particular die of the set of dice that is not the last die, the partially applying of the hash function can include adding to the pre-processed message of the particular die, with additional padding, the partial digest of the first die or the accumulation of partial digests.

It is to be understood that SHA256 is just one example hash function of many different types of hash functions that can be partially or fully applied for the calculating of the hash value. For example, any one or more cryptographic hash functions can be used to partially or fully apply the hash function for the calculating of the hash value as long the hash function(s) include one or more padding features. In some embodiments, the hash function can include any cryptographic hash function. Instead of using SHA256, some of the embodiments can use any variation of MD5, SHA-1, SHA-2, SHA-3, BLAKE2, RIPEMD-160, Whirlpool, or any combination thereof.

At step 314, the calculating the hash value of the secure array can also include, for the last die in the set of dice, receiving by the last die, the accumulation of partial digests of all or a subset of preceding dice in the set.

At step 316, the calculating the hash value of the secure array can also include, for the last die in the set of dice, fully applying the hash function, with the certain padding, to the memory blocks of the secure array in the last die to generate a complete digest for the last die that includes the hash value of the secure array.

At step 318, the calculating the hash value of the secure array can also include, for the last die in the set of dice, in the fully applying of the hash function, adding the partial digest of the first die or the accumulation of partial digests to a pre-processed message comprising data from the memory blocks of the last die as a basis for the generation of the complete digest of the last die and the hash value of the secure array.

As mentioned, the hash function can include SHA256. And, for the last die, the fully applying of the hash function can include adding to the pre-processed message of the last die, with additional padding, the partial digest of the first die or the accumulation of partial digests. And, for the last die, the fully applying of the hash function can include applying the function with final padding of SHA256.

At step 320, the method 300 continues with validating the hash value of the secure array by comparing the hash value to a validation code. When the validation of the hash value of the secure array fails by not matching the validation code, the method 300 can include restoring data defined by the secure array from a secure memory region. The secure memory region can be in the set of dice. When the validation of the hash value of the secure array is successful by matching the validation code, the method 300 can include logging the successful validation of the secure array.

Figure 4:
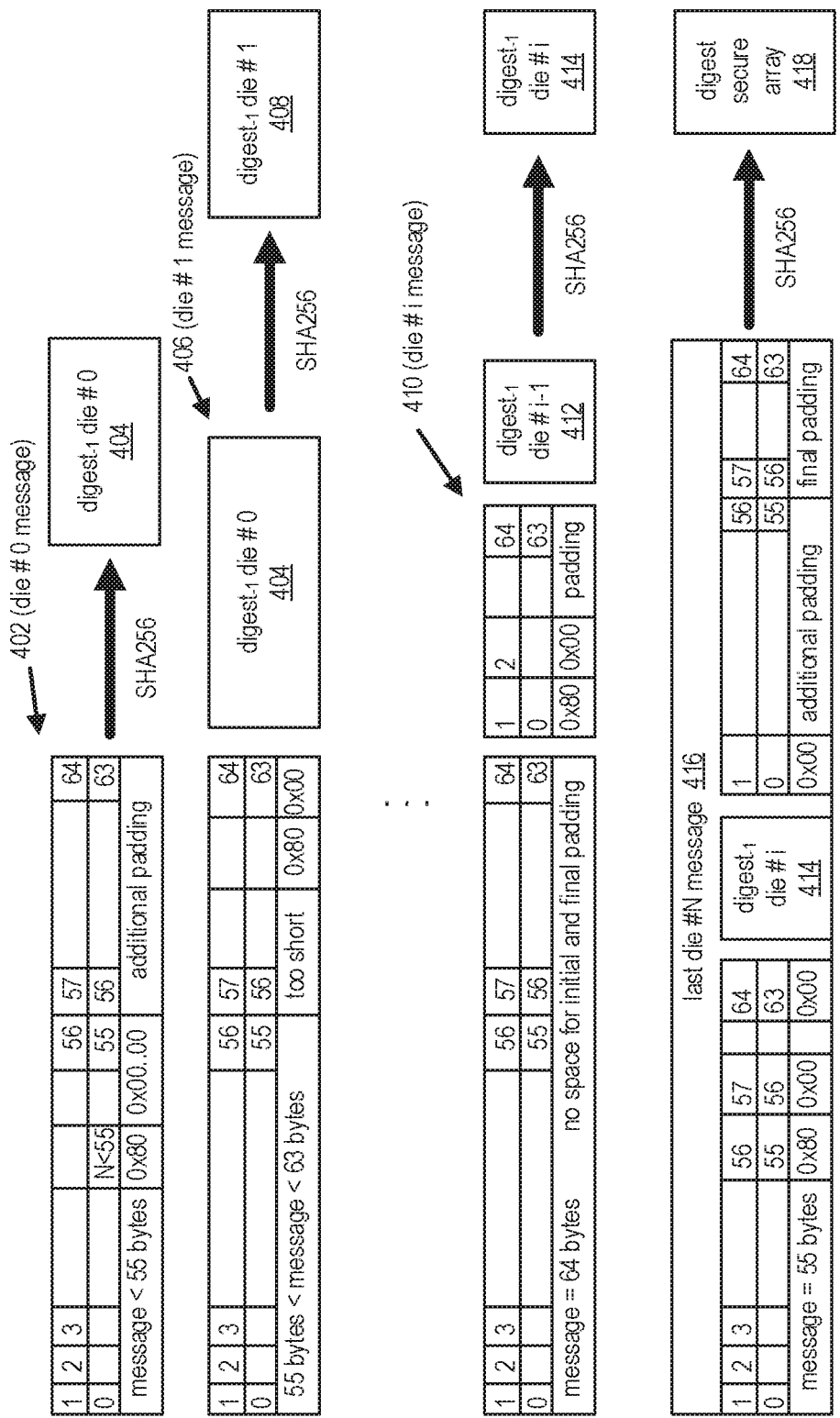
Figure 5:
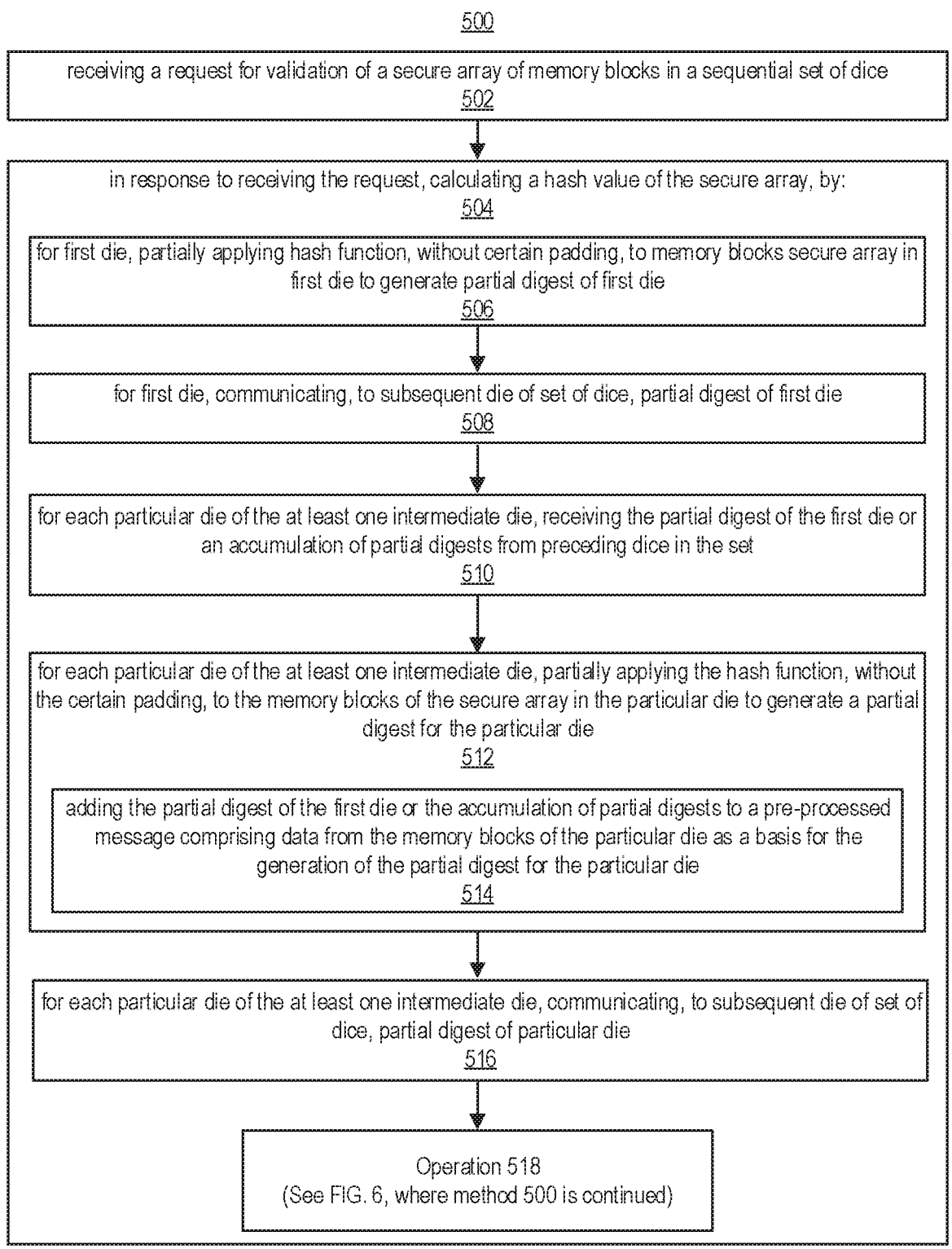

FIG. 4 illustrates a graphical representation of some of the parsing and padding rules related to the methods depicted in FIGS. 3, 5 and 6. FIG. 4 depicts a pre-processed message 402, for a first die in a sequential set of dice, that is input for a part of the hashing function when the hashing function includes SHA256. After the pre-processed message 402 is parsed by the part of the hashing function, the part of the hashing function outputs the partial digest 404 for the first die in the sequential set of dice.

FIG. 4 also depicts a pre-processed message 406, for a second die in the sequential set of dice, that is input for a part of the hashing function when the hashing function includes SHA256. As shown, the pre-processed message 406 includes two sections, one shown in greater detail, and the other showing the partial digest 404 for the first die. After the pre-processed message 406 is parsed by the part of the hashing function, the part of the hashing function outputs the partial digest 408 for the second die in the sequential set of dice.

FIG. 4, also depicts a pre-processed message 410, for a second to last die (die #i) in the sequential set of dice, that is input for a part of the hashing function when the hashing function includes SHA256. As shown, the pre-processed message 410 includes three sections, one shown in greater detail, one shown in lesser detail, and one shown with even lesser detail. The one shown with the least detail shows the partial digest 412 for a third to last die of the set of dice (die #i-1). After the pre-processed message 410 is parsed by the part of the hashing function, the part of the hashing function outputs the partial digest 414 for the second to last die in the sequential set of dice. Such functionality and messages can occur for each die in a set of dice described herein, except for the last die where the hash function is computed completely instead of partially.

To put it another way, the messages 402, 406, and 410 as well as partial digests 404, 408, 412 and 414 include information derived from a partial implementation of the hash function that includes SHA256. Whereas, the pre-processed message 416 of the last die as well as the complete digest 418 for the secure array include information derived from a complete implementation of the hash function that includes SHA256.

FIG. 4, also depicts a pre-processed message 416, for the last die (die #N) in the sequential set of dice, that is input for a part of the complete hashing function when the hashing function includes SHA256. As shown, the pre-processed message 416 includes three sections, two shown in greater detail and one shown in lesser detail. The one shown with the least detail shows the partial digest 414 for a second to last die of the set of dice (die #i). The first of the more detailed shown sections includes the substantive message of the blocks of the secure array in the last die as well the appending of "1" (labeled "0x80") after the last byte of the message and additional appending of zeros (labeled "0x00") so that the message length is a multiple of 64 bytes. The second of the more detailed shown sections includes additional padding and the final padding of SHA 256. After the pre-processed message 416 is parsed by the part of the complete hashing function, the part of the hashing function outputs the complete digest 418 for the last die in the sequential set of dice and for the secure array as a whole.

In some embodiments, the partial digest 408 is an accumulated digest for memory blocks from the secure array in the first and second dice. In such embodiments, the partial digest 412 is an accumulation for memory blocks from the secure array in all or a subset of the dice preceding the second to last die. Also, the partial digest 414 is an accumulation for memory blocks from the secure array in all or a subset of the dice preceding the last die. In such embodiments, the pre-processed message 416 for the last die can provide the complete input needed for SHA 256 to output a complete digest or hash value for the entire secure array. This is because the message 416 of the last die includes the last die's contribution to the secure array (e.g., see the 55-byte message in the pre-processed message 416) and a hashed representation of all or a subset of the preceding dice's contributions to the secure array (e.g., see the partial digest 414) as well as the necessary padding (including the final padding) for SHA 256 to complete the hashing of the secure array.

It is to be understood that FIG. 4 illustrates simplified instances of information parsed and padded in the methods described herein. The simplified instances are for the purposes of explaining the information of the processes in a concise manner. For example, the four messages depicted for four different die each only have one to three sections. Considering that a SHA 256 function can parse messages of approximately 2,091,752 TB, each message could have just about any number of sections such as thousands of sections.

Also, FIG. 4 illustrates an example rule of appending "1" after the last byte of the message of a die (e.g., see "0x80" which represents "b10000000"). FIG. 4 also illustrates the example rule to append a certain number of zeros in order to have a message length being a multiple of 64 bytes and have 8 bytes free for writing in the last eight bytes of the message and then divide the pre-processed message into N blocks of 64 bytes.

FIGS. 5-6 also illustrate a flow diagram of example operations of method 500, in accordance with some embodiments of the present disclosure. In FIG. 5, the method 500 begins at step 502, with receiving a request for validation of a secure array of memory blocks in a sequential set of dice. The sequential set of dice can have a first die, at least one intermediate die, and a last die. The secure array can be defined by a set of address-size pairs for the memory blocks. Each pair of the address-size pairs can include an address of a memory block in the secure array and a size of the block such that the pair provides a pointer to the block.

Also, the set of dice can be within a packaged memory device. The set of dice can be stacked. The set of dice can be distributed across multiple memory devices in a computer system. And, the computer system can include multiple computers that are distributed over a computer network comprising a local area network, a wide area network, or a combination thereof.

At step 504, the method 500 continues with, in response to receiving the request, calculating a hash value of the secure array.

At step 506, the calculating the hash value of the secure array can include, for first die, partially applying hash function, without certain padding, to memory blocks secure array in first die to generate partial digest of first die.

At step 508, the calculating the hash value of the secure array can also include, for first die, communicating, to subsequent die of set of dice, partial digest of first die.

At step 510, the calculating the hash value of the secure array can also include, for each particular die of the at least one intermediate die, receiving the partial digest of the first die or an accumulation of partial digests from all or a subset of preceding dice in the set.

At step 512, the calculating the hash value of the secure array can also include, for each particular die of the at least one intermediate die, partially applying the hash function, without the certain padding, to the memory blocks of the secure array in the particular die to generate a partial digest for the particular die.

At step 514, the calculating the hash value of the secure array can also include, in the partially applying of the hash function for the particular die, adding the partial digest of the first die or the accumulation of partial digests to a pre-processed message comprising data from the memory blocks of the particular die as a basis for the generation of the partial digest for the particular die.

At step 516, the calculating the hash value of the secure array can also include, for each particular die of the at least one intermediate die, communicating, to subsequent die of set of dice, partial digest of particular die.

The hash function can include SHA256, and, for each particular die of the set of dice that is not the last die, the partially applying of the hash function can include applying the function without final padding of SHA256. Also, for each particular die of the set of dice that is not the last die, the partially applying of the hash function can include adding to the pre-processed message of the particular die, with additional padding, the partial digest of the first die or the accumulation of partial digests.

In FIG. 6, at step 518, the calculating the hash value of the secure array can also include, for the last die in the set of dice, receiving the accumulation of partial digests from all or a subset of the preceding dice in the set.

At step 520, the calculating the hash value of the secure array can also include, for the last die in the set of dice, fully applying the hash function, with the certain padding, to the memory blocks of the secure array in the last die to generate a complete digest for the last die that includes the hash value of the secure array.

At step 522, the calculating the hash value of the secure array can also include, in the fully applying of the hash function for the last die, adding the accumulation of partial digests to a pre-processed message comprising data from the memory blocks of the last die as a basis for the generation of the complete digest of the last die and the hash value of the secure array.

As mentioned, the hash function can include SHA256. And, for the last die, the fully applying of the hash function can include adding to the pre-processed message of the last die, with additional padding, the partial digest of the first die or the accumulation of partial digests. And, for the last die, the fully applying of the hash function can include applying the function with final padding of SHA256.

At step 524, the method 500 continues with validating the hash value of the secure array by comparing the hash value to a validation code. In some embodiments, when the validation of the hash value of the secure array fails by not matching the validation code, the method 500 includes restoring data defined by the secure array from a secure memory region. The secure memory region can be in the set of dice. In some embodiments, when the validation of the hash value of the secure array is successful by matching the validation code, the method 500 includes logging the successful validation of the secure array.

With respect to the method 300, method 500, or any other method, process, or operation described herein, in some embodiments, a non-transitory computer-readable storage medium stores instructions that, when executed by at least one processing device (such as controller 806 shown in FIG. 8), cause the at least one processing device to perform the method 300, method 500, or any other method, process, or operation described herein, and/or any combination thereof.

Also, for example, some embodiments can include a non-transitory computer-readable storage medium tangibly encoded with computer-executable instructions, that when executed by a processor of a computing device, causes the processor to perform any one of the methods described herein, including a method including receiving a request for calculating a hash value of a secure array of memory blocks in a sequential set of dice. The set of dice can include at least a first die and a last die. The secure array can be defined by a set of address-size pairs for the memory blocks. Each pair of the address-size pairs can include an address of a memory block in the secure array and a size of the block such that the pair provides a pointer to the block. The method can also include: in response to receiving the request, calculating the hash value of the secure array, by: for each particular die of the set of dice that is not the last die: partially applying the hash function, without the certain padding, to the memory blocks of the secure array in the particular die to generate a partial digest for the particular die; and communicating, to a subsequent die of the set of dice, the partial digest of the particular die. The method can also include: in response to receiving the request, calculating the hash value of the secure array, by: for the last die in the set of dice, fully applying the hash function, with the certain padding, to the memory blocks of the secure array in the last die to generate a complete digest for the last die that includes the hash value of the secure array.

Figure 7:
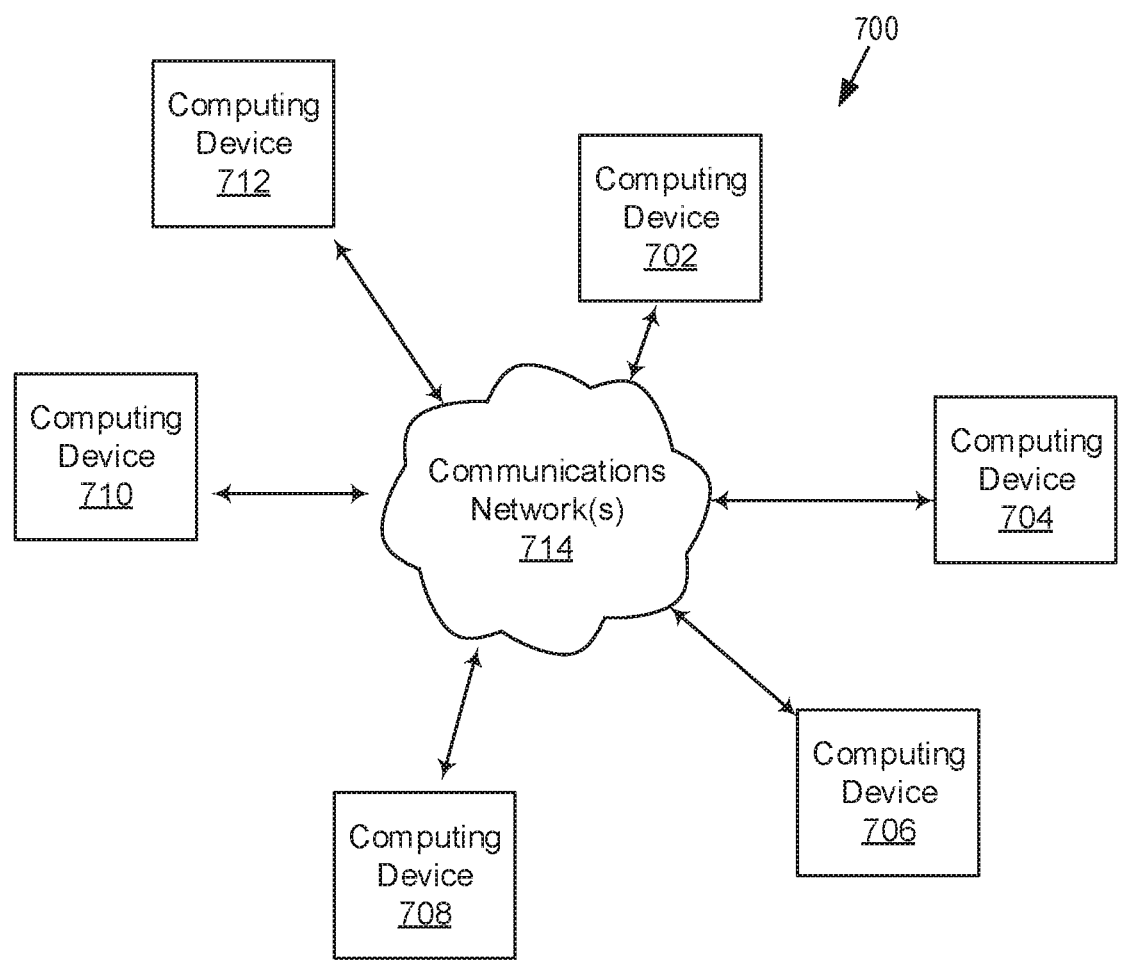
FIG. 7 illustrates an example computing system 700 that can implement a single distributed secure array using intra-dice communications to perform data attestation across a sequential set of dice, in accordance with some embodiments of the present disclosure.

FIG. 7 illustrates an example computing system 700 that can implement a single distributed secure array using intra-dice communications to perform data attestation across a sequential set of dice, in accordance with some embodiments of the present disclosure. The system 700 includes computing devices 702-712 and one or more communications networks 714. Each of the computing devices 702-712 can include one or more MCPs each of the MCPs have a plurality of dice. The communications network(s) 714 includes at least a wide area network (WAN), a local area network (LAN), an intranet, an extranet, the Internet, and/or any combination thereof.

Each of the computing devices described herein (such as computing devices 702-712) can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated for each of the illustrated computing devices of FIG. 7 as well as the computing device of FIG. 8, the term "machine" shall also be taken to include any collection of machines that individually or jointly execute a set (or multiple sets) of instructions to perform any one or more of the methodologies or operations discussed herein. And, each of the illustrated computing devices can each include at least a bus and/or motherboard, one or more controllers (such as one or more CPUs), a main memory that can include temporary data storage, at least one type of network interface, a storage system that can include permanent data storage, and/or any combination thereof.

Figure 8:
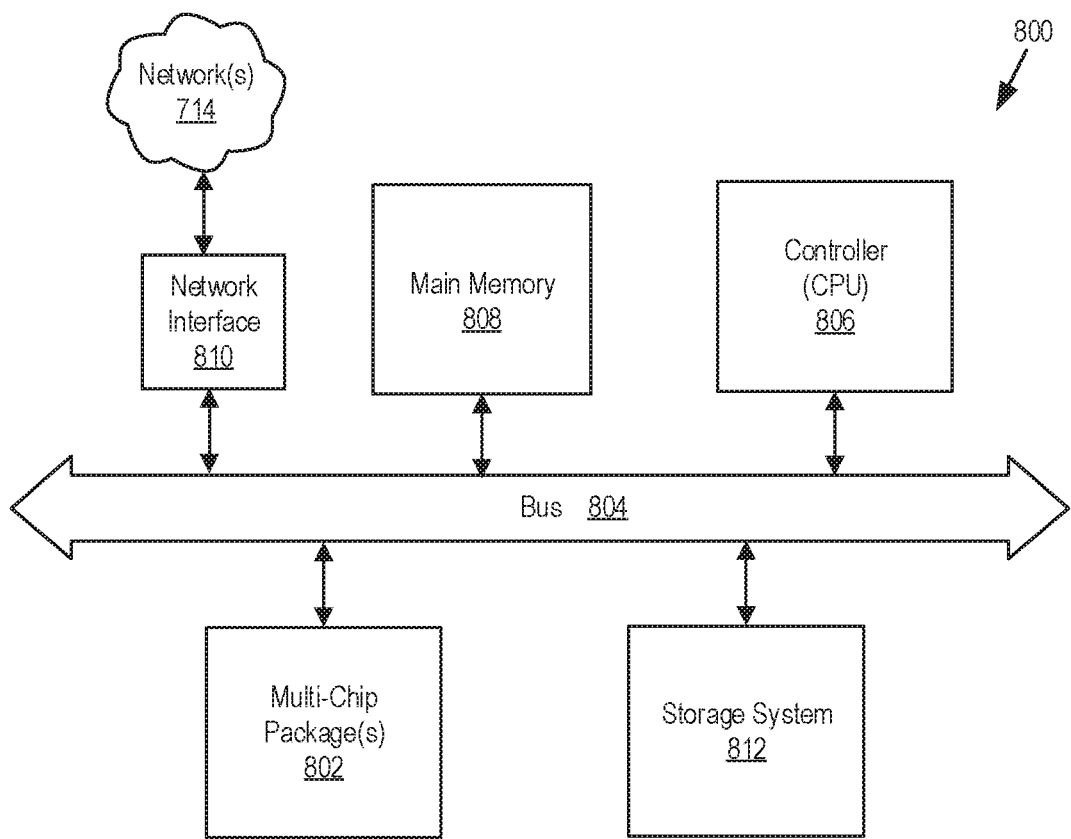
FIG. 8 illustrates example parts of an example computing device 800, in accordance with some embodiments of the present disclosure.

FIG. 8 illustrates example parts of an example computing device 800, in accordance with some embodiments of the present disclosure. The device 800 can be communicatively coupled to the network(s) 714 as shown. The device 800 includes at least one or more MCPs 802, a bus 804, a controller 806 (such as a CPU), a main memory 808, a network interface 810, and a data storage system 812. The bus 804 communicatively couples the MCP(s) 802, the controller 806, the main memory 808, the network interface 810, and the data storage system 812. The device 800 includes a computer system that includes at least controller 806, main memory 808 (e.g., read-only memory (ROM), flash memory, dynamic random access memory (DRAM) such as synchronous DRAM (SDRAM) or Rambus DRAM (RDRAM), static random access memory (SRAM), etc.), and data storage system 812, which communicate with each other via bus 804 (which can include multiple buses).

To put it another way, FIG. 8 is a block diagram of an example device 800 having a computer system in which embodiments of the present disclosure can operate. In some embodiments, the computer system can include a set of instructions, for causing a machine to perform any one or more of the methodologies discussed herein, when executed. In such embodiments, the machine can be connected (e.g., networked via network interface 810) to other machines in a LAN, an intranet, an extranet, and/or the Internet (e.g., network(s) 714). The machine can operate in the capacity of a server or a client machine in client-server network environment, as a peer machine in a peer-to-peer (or distributed) network environment (such as the peer-to-peer networks described herein), or as a server or a client machine in a cloud computing infrastructure or environment.

Controller 806 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Controller 806 can also be one or more special-purpose processing devices such as an application specific integrated circuit (ASIC), a field programmable gate array (FPGA), a digital signal processor (DSP), network processor, or the like. Controller 806 is configured to execute instructions for performing the operations and steps discussed herein. Controller 806 can further include a network interface device such as network interface 810 to communicate over one or more communications network (such as network(s) 714).

The data storage system 812 can include a machine-readable storage medium (also known as a computer-readable medium) on which is stored one or more sets of instructions or software embodying any one or more of the methodologies or functions described herein. The instructions can also reside, completely or at least partially, within the main memory 808 and/or within the controller 806 during execution thereof by the computer system, the main memory 808 and the controller 806 also constituting machine-readable storage media. While the memory, controller, and data storage parts are shown in the example embodiment to each be a single part, each part should be taken to include a single part or multiple parts that can store the instructions and perform their respective operations. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
  receiving a request for calculating a hash value of a secure array of memory blocks in a sequential set of dice,
    the set of dice comprising at least a first die and a last die,
    the secure array defined by a set of address-size pairs for the memory blocks, and
    each pair of the address-size pairs comprising an address of a memory block in the secure array and a size of the block such that the pair provides a pointer to the block; and
  in response to receiving the request, calculating the hash value of the secure array, by:
    for each particular die of the set of dice that is not the last die:
      partially applying a hash function, without final padding of the hash function, to the memory blocks of the secure array in the particular die to generate a partial digest for the particular die; and
      communicating, to a subsequent die of the set of dice, the partial digest of the particular die; and
    for the last die in the set of dice, fully applying the hash function, with the final padding, to the memory blocks of the secure array in the last die to generate a complete digest for the last die that includes the hash value of the secure array.

2. The method of claim 1, further comprising:
  for each particular die of the set of dice that is not the first die or the last die:
    receiving by the particular die, from a preceding die of the set, the partial digest of the first die or an accumulation of partial digests of all or a subset of preceding dice in the set; and
    in the partially applying of the hash function, adding the partial digest of the first die or the accumulation of partial digests to a pre-processed message comprising data from the memory blocks of the particular die as a basis for the generation of the partial digest for the particular die; and
  for the last die in the set of dice:
    receiving by the last die, the accumulation of partial digests of all or the subset of preceding dice in the set; and
    in the fully applying of the hash function, adding the partial digest of the first die or the accumulation of partial digests to a pre-processed message comprising data from the memory blocks of the last die as a basis for the generation of the complete digest of the last die and the hash value of the secure array.

3. The method of claim 2, wherein the hash function comprises SHA256, and wherein, for each particular die of the set of dice that is not the last die, the partially applying of the hash function comprises applying the function without final padding of SHA256.

4. The method of claim 3, wherein, for each particular die of the set of dice that is not the last die, the partially applying of the hash function comprises adding to the pre-processed message of the particular die, with additional padding, the partial digest of the first die or the accumulation of partial digests.

5. The method of claim 2, wherein the hash function comprises SHA256, and wherein, for the last die, the fully applying of the hash function comprises:
  adding to the pre-processed message of the last die, with additional padding, the partial digest of the first die or the accumulation of partial digests; and
  applying the function with final padding of SHA256.

6. The method of claim 1, further comprising validating the hash value of the secure array by comparing the hash value to a validation code.

7. The method of claim 6, further comprising, when the validation of the hash value of the secure array fails by not matching the validation code, restoring data defined by the secure array from a secure memory region.

8. The method of claim 7, wherein the secure memory region is in the set of dice.

9. The method of claim 6, further comprising, when the validation of the hash value of the secure array is successful by matching the validation code, then logging the successful validation of the secure array.

10. The method of claim 1, wherein the set of dice are within a packaged memory device.

11. The method of claim 10, wherein the set of dice are stacked.

12. The method of claim 1, wherein the set of dice are distributed across multiple memory devices in a computer system.

13. The method of claim 12, wherein the computer system comprises multiple computers that are distributed over a computer network comprising a local area network, a wide area network, or a combination thereof.

14. A method, comprising:
receiving a request for validation of a secure array of memory blocks in a sequential set of dice,
the sequential set of dice comprising a first die, at least one intermediate die, and a last die,
the secure array defined by a set of address-size pairs for the memory blocks, and
each pair of the address-size pairs comprising an address of a memory block in the secure array and a size of the block such that the pair provides a pointer to the block; and
in response to receiving the request, calculating a hash value of the secure array, by:
for the first die:
partially applying a hash function, without final padding of the hash function, to the memory blocks of the secure array in the first die to generate a partial digest of the first die; and
communicating, to a subsequent die of the set of dice, the partial digest of the first die;
for each particular die of the at least one intermediate die:
receiving the partial digest of the first die or an accumulation of partial digests from all or a subset of preceding dice in the set;
partially applying the hash function, without the final padding, to the memory blocks of the secure array in the particular die to generate a partial digest for the particular die,
the partially applying of the hash function for the particular die comprising adding the partial digest of the first die or the accumulation of partial digests to a pre-processed message comprising data from the memory blocks of the particular die as a basis for the generation of the partial digest for the particular die; and
communicating, to the subsequent die of the set of dice, the partial digest of the particular die; and
for the last die in the set of dice:
receiving the accumulation of partial digests from all or the subset of preceding dice in the set; and
fully applying the hash function, with the final padding, to the memory blocks of the secure array in the last die to generate a complete digest for the last die that includes the hash value of the secure array,
the fully applying of the hash function comprising adding the accumulation of partial digests to a pre-processed message comprising data from the memory blocks of the last die as a basis for the generation of the complete digest of the last die and the hash value of the secure array.

15. The method of claim 14, wherein the hash function comprises SHA256, and wherein, for each particular die of the set of dice that is not the last die, the partially applying of the hash function comprises applying the function without final padding of SHA256.

16. The method of claim 15, wherein, for each particular die of the set of dice that is not the last die, the partially applying of the hash function comprises adding to the pre-processed message of the particular die, with additional padding, the partial digest of the first die or the accumulation of partial digests.

17. The method of claim 14, wherein the hash function comprises SHA256, and wherein, for the last die, the fully applying of the hash function comprises:
adding to the pre-processed message of the last die, with additional padding, the accumulation of partial digests; and
applying the function with final padding of SHA256.

18. The method of claim 14, further comprising validating the hash value of the secure array by comparing the hash value to a validation code.

19. The method of claim 18, further comprising, when the validation of the hash value of the secure array fails by not matching the validation code, restoring data defined by the secure array from a secure memory region in the set of dice.

20. A non-transitory computer-readable storage medium tangibly encoded with computer-executable instructions, that when executed by a processor of a computing device, causes the processor to perform a method, the method comprising:
receiving a request for calculating a hash value of a secure array of memory blocks in a sequential set of dice,
the set of dice comprising at least a first die and a last die,
the secure array defined by a set of address-size pairs for the memory blocks, and
each pair of the address-size pairs comprising an address of a memory block in the secure array and a size of the block such that the pair provides a pointer to the block; and
in response to receiving the request, calculating the hash value of the secure array, by:
for each particular die of the set of dice that is not the last die:
partially applying a hash function, without final padding of the hash function, to the memory blocks of the secure array in the particular die to generate a partial digest for the particular die; and
communicating, to a subsequent die of the set of dice, the partial digest of the particular die; and
for the last die in the set of dice, fully applying the hash function, with the final padding, to the memory blocks of the secure array in the last die to generate a complete digest for the last die that includes the hash value of the secure array.

\* \* \* \* \*